United States Patent [19]

Hirose

[11] Patent Number: 5,599,148

[45] Date of Patent: Feb. 4, 1997

[54] FIXING DEVICE FOR SHEET MEMBER

[75] Inventor: Akihiko Hirose, Zama, Japan

[73] Assignee: Nifco, Inc., Yokohama, Japan

[21] Appl. No.: 113,130

[22] Filed: Aug. 30, 1993

[51] Int. Cl.⁶ .................................................. F16B 37/04
[52] U.S. Cl. ................... 411/175; 411/112; 411/338
[58] Field of Search .................... 411/172, 173, 411/174, 175, 112, 374, 113, 338, 182, 437, 339

[56] References Cited

U.S. PATENT DOCUMENTS

| | | | |
|---|---|---|---|
| 312,402 | 2/1885 | Strathy | 411/374 |
| 794,636 | 7/1905 | Oebbecke | 411/338 X |
| 796,650 | 8/1905 | Holmes | 411/374 X |
| 2,552,805 | 5/1951 | Murphy | 411/338 X |
| 2,560,961 | 7/1951 | Knohl | 411/173 |
| 2,668,340 | 2/1954 | Jones | 411/338 X |
| 2,936,015 | 5/1960 | Rapata | 411/913 X |
| 3,352,195 | 11/1967 | Fisher | 411/338 X |
| 3,553,796 | 1/1971 | Carlile | 411/338 X |
| 3,701,605 | 10/1972 | Morishima | 411/338 X |
| 3,890,680 | 6/1975 | Furuya | 411/338 X |
| 4,286,642 | 9/1981 | Keatley | 411/112 |
| 4,352,589 | 10/1982 | Allison et al. | |
| 4,376,605 | 3/1983 | Thomsen | 411/112 |
| 4,996,752 | 3/1991 | Clendinen . | |

FOREIGN PATENT DOCUMENTS

| | | | |
|---|---|---|---|
| 175636 | 3/1986 | European Pat. Off. | 411/174 |
| 311498 | 4/1989 | European Pat. Off. | 411/174 |
| 2085516 | 4/1982 | United Kingdom . | |
| 2201723 | 9/1988 | United Kingdom . | |

*Primary Examiner*—Rodney M. Lindsey
*Attorney, Agent, or Firm*—Schwartz & Weinrieb

[57] ABSTRACT

A fixing device for securing a sheet member to a substrate, having a stud projecting upwardly therefrom, comprises a cap member which is disposed over the stud and has inwardly projecting detents for engaging threaded portions of the stud. The sheet member has an aperture defined therethrough and within which the stud and cap member assembly project. A first clip member has a first flange portion for engaging one surface of the sheet member, and a body portion extending within the aperture of the sheet member so as to surround the cap member. A second clip member has a second flange portion for engaging a second surface of the sheet member, and a body portion which is also inserted within the aperture of the sheet member so as to be interposed between the cap member and the body portion of the first clip member. The cap member is provided with an annular groove, the second clip member is provided with an annular projection for engaging the annular groove of the cap member, and detents of the second clip member engage the body portion of the first clip member so as to permit engagement of the first and second clip members. The first and second clip members are also connected together by a flexible strap.

12 Claims, 2 Drawing Sheets

FIXING DEVICE FOR SHEET MEMBER

BACKGROUND OF THE INVENTION

1. Field of the Invention

The present invention relates to a fixing device for mounting a sheet member such as a carpet, an insulator, or the like, on a base such as an automobile floor panel or the like.

2. Description of the Prior Art

As shown in FIG. 3, the passenger compartment in an ordinary automobile has a sheet member 1 such as an insulator and/or a carpet laid on its floor panel for noiseproofing and ornamental purposes and the same is retained by clips 2 so that the sheet member 1 does not turn up.

As is clear from FIG. 4 which is a cross sectional view taken along line 4—4 in FIG. 3, the sheet member 1 comprises an insulator 4 laid on the floor panel 3 and a carpet 5 laid on the insulator 4. The insulator 4 has a laminated structure consisting of a rubber layer 4a and a felt layer 4b. The insulator 4 and carpet 5 have respective through holes 6 and 7. The floor panel 3 has a stud 8 formed upright thereon at each position corresponding to a pair of through holes 6 and 7 of the insulator 4 and carpet 5. After the sheet member 1 has been set in position by inserting the studs 8 into the through holes 6 and 7, the clips 2 are engaged with the studs 8 so as to fix the sheet member 1.

The clip 2 comprises a body portion 12a having a central engaging hole 11 and a head portion 12b integral with one end of the body portion 12a. The inner wall of the body portion 12a defining the central engaging hole 11 is provided with a pair of engaging claws 10 for engaging the thread grooves of the stud 8 so as to non-returnably retain the clip 2.

With this arrangement, the sheet member 1 is mounted on the floor panel 3 by laying the insulator 4 and carpet 5 on the floor panel 3, with their through holes 6 and 7 registered and receiving the studs 8 therein, and pushing the clips 2 against the studs 8 utilizing the through holes 6 and 7, thereby inserting the studs 8 into the central engaging holes 11 of the body portions 12a of the clips 2. At this time, while the head portion 12b of each clip 2 urges the sheet member 1 downward, the engaging claws 10 in the central engaging hole 11 engage with the thread grooves of the stud 8 so that the clip is non-removably retained. Therefore, the sheet member 1 is pinched between the head portion 12b of the clip 2 and the floor panel 3.

According to the prior art fixing device described above, however, there is a possibility of the thread grooves formed in the periphery of the stud 8 colliding against and catching the periphery walls of the through holes 6 and 7 of the insulator 4 and carpet 5, thereby failing to smoothly insert the stud 8 into the through holes 6 and 7 and turning up peripheral wall portions of the insulator 4 and carpet 5 defining the through holes 6 and 7. Thus, the prior art fixing device exhibits inferior operability. In addition, the clip 2 is separate from both the stud 8 and the sheet member 1. For this reason, the clip 2 is troublesome to handle and is easy to misplace or lose.

OBJECT OF THE INVENTION

The main object of the present invention is to provide a fixing device for mounting a sheet member on a base, which enables the sheet member to be easily mounted and has a configuration such that the sheet member can be detached from a stud on the base without removing a clip attached to the sheet member whereby loss of the clip member can be pevented.

SUMMARY OF THE INVENTION

To attain the foregoing and other objects, according to the present invention there is provided a fixing device for mounting a sheet member having a through hole on a base having a stud for passing through the through hole of the sheet member, which comprises a plastic cap member for covering the stud and having an engaging portion formed on a periphery thereof, and a plastic clip engaged with the cap member, the plastic clip comprising a first clip member which includes a first cylindrical body provided at a center thereof with a first engaging hole and fitted in the through hole of the sheet member and a first flange integrally formed on a periphery of one end of the first cylindrical body, a second clip member which includes a second cylindrical body provided at a center thereof with a second engaging hole for permitting insertion thereinto and engagement therein of the cap member and fitted in the first engaging hole of the first clip member and a second flange integrally formed on a periphery of one end of the second cylindrical body, and a flexible connecting member which has opposite ends integral with the first flange and the second flange respectively to connect the first clip member and the second clip member together, the first cylindrical body of the first clip member being inserted from one side of the sheet member into and fitted in the through hole of the sheet member and the second cylindrical body of the second clip member being inserted from the other side of the sheet member into and fitted in the first engaging hole of the first cylindrical body fitted in the through hole of the sheet member so as to pinch the sheet member between the first flange and the second flange, the clip having the sheet member pinched between the first clip member and the second clip member being inserted onto and engaged with the cap member covering the stud through the second engaging hole of the second clip member, whereby the sheet member is mounted on and fixed to the base by the fixing device.

BRIEF DESCRIPTION OF THE DRAWING

The above and other objects, characteristic features and advantages of the present invention will become more apparent to those skilled in the art from the description of the invention to be given hereinbelow with reference to the accompanying drawings, in which like reference characters designate like or corresponding parts throughout the several views, and wherein.

DETAILED DESCRIPTION OF THE PREFERRED EMBODIMENT

The present invention will now be described with reference to FIGS. 1 and 2.

Figure 1:
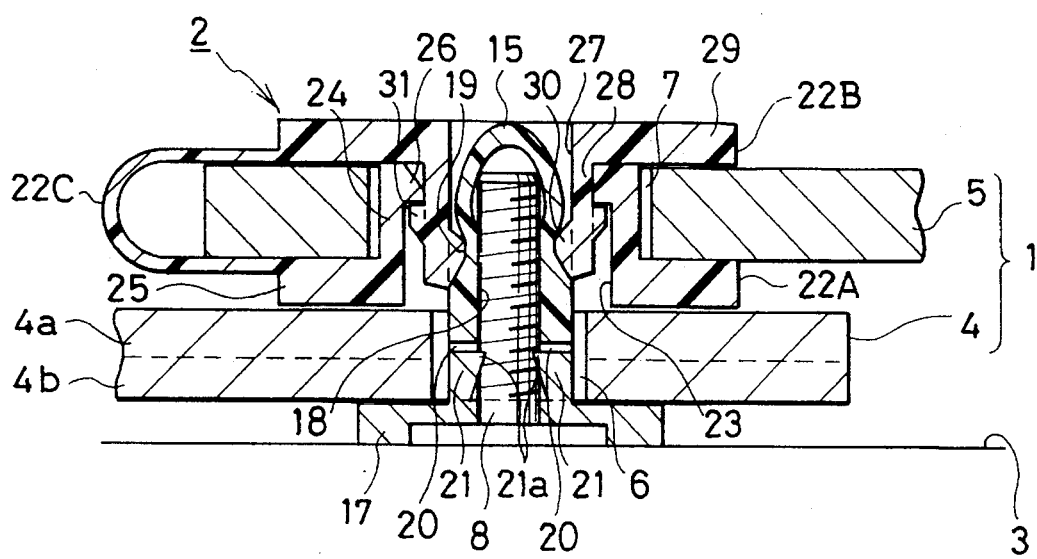
FIG. 1 is a cross sectional view showing one embodiment of the fixing device for mounting a sheet member on a base according to the present invention.
Figure 2:
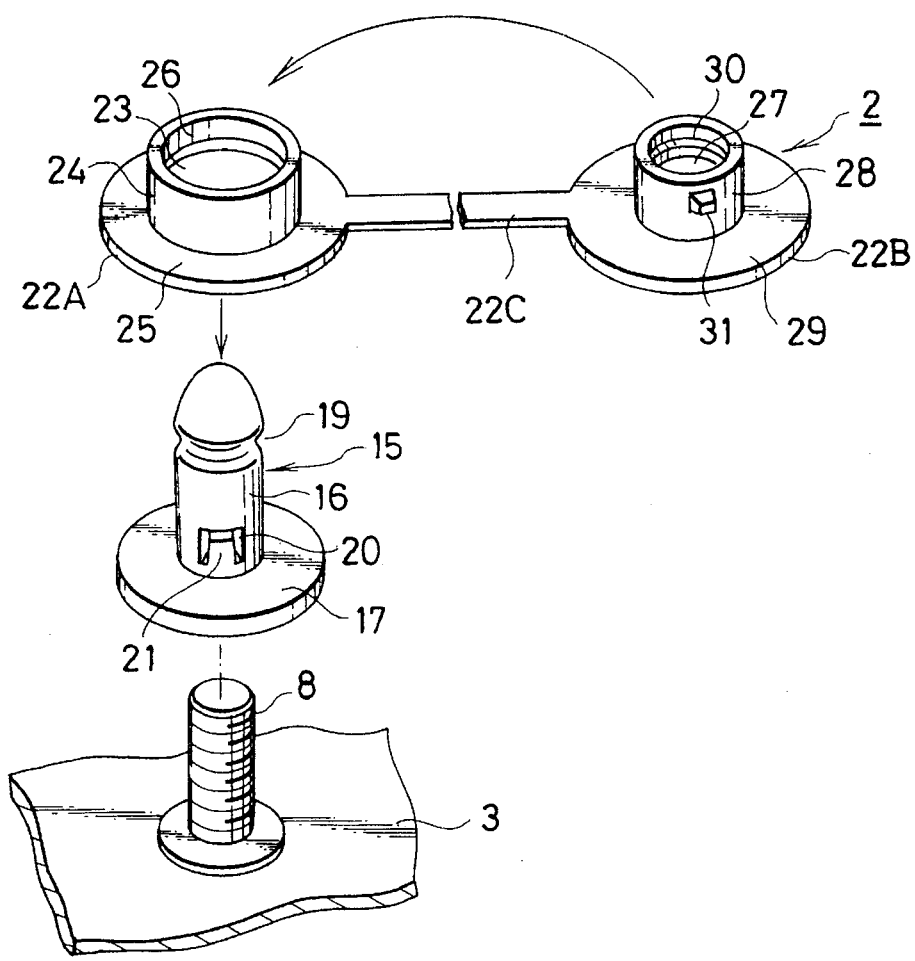
FIG. 2 is an exploded perspective view showing the fixing device in relation to the base.
Figure 3:
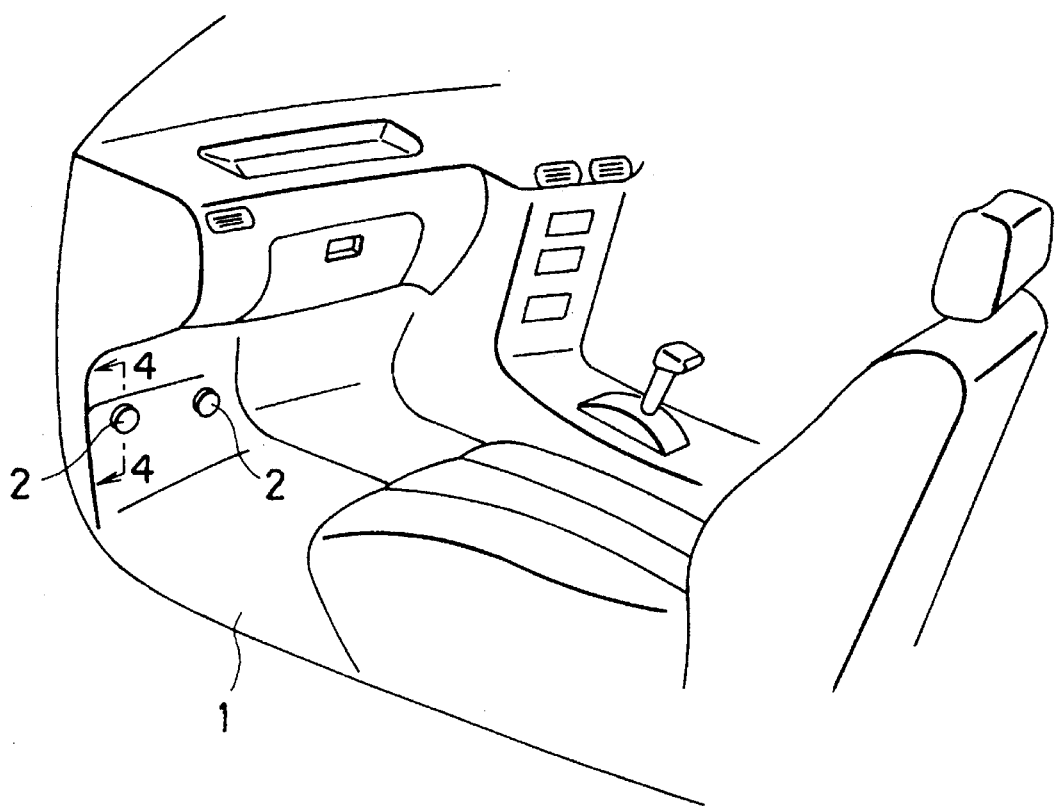
FIG. 3 is a schematic perspective view showing the passenger compartment in an ordinary car provided with a prior art fixing device.
Figure 4:
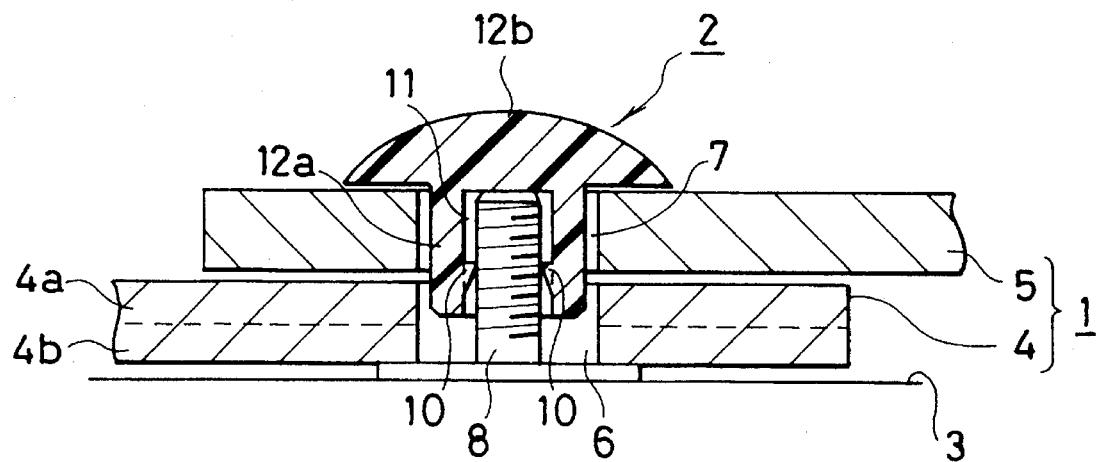
FIG. 4 is a cross sectional view taken along line 4—4 in FIG. 3.

FIG. 1 is a cross section, similar to that of FIG. 4, showing one embodiment of the fixing device according to the present invention, and FIG. 2 is an exploded perspective view showing the principal parts of the fixing device of FIG. 1.

As shown in FIG. 1, a sheet member 1 to be mounted on a base 3 such as the floor panel of an automobile (not shown) by the fixing device according to the present invention comprises an insulator 4 and a carpet 5 having through holes 6 and 7, respectively. The insulator 4 has a laminated structure consisting of a rubber layer 4a and a felt layer 4b. The base 3 has an upright stud 8 welded thereto at a position corresponding to the position of the through holes 6 and 7.

As shown in FIG. 2, the fixing device of the present invention comprises a plastic clip 2 and a plastic cap member 15.

The cap member 15 comprises a body portion 16 and a flange portion 17 integral with one end of the body portion 16 and has a fitting hole 18 (FIG. 1) formed therein from the bottom of the flange portion 17 into the body portion 16 for permitting insertion of the stud 8 thereinto. The other end of the body portion 16 is provided with an engaging groove 19 and is tapered above the engaging groove 19. The body portion 16 is further provided with a pair of opposed U-shaped slits 20 on the side of the flange portion 17 so as to define a pair of opposed engaging pieces 21 which have detent pawls 21a projecting into the fitting hole 18. When the cap member 15 is inserted from the fitting hole 18 onto the stud 8 so as to cover it, the detent pawls 21a of the cap member 15 engage with the thread grooves of the stud 8 so as to non-removably retain the cap member 15 upon the stub 8.

The sheet member 1 is fixed to the stud 8 covered by the cap member 15 using the clip 2 which comprises a first clip member 22A, a second clip member 22B and a flexible connecting member 22C for connecting the first and second clip members 22A and 22B together.

The first clip member 22A comprises a first cylindrical body 24 having an outside diameter smaller than the inside diameter of the through hole 7 of the carpet 5 and provided with a first engaging hole 23 at the center thereof and a first annular engaging projection 26 in the first engaging hole 23, and a first flange 25 integrally formed on one end of the first cylindrical body 24.

The second clip member 22B comprises a second cylindrical body 28 having an outside diameter smaller than the diameter of the first engaging hole 23 of the first clip member 22A and is provided with a second engaging hole 27 at the center thereof, a pair of opposed engaging protuberances 31 on the periphery thereof and a second annular engaging projection 30 in the second engaging hole 27, and a second flange 29 integrally formed on one end of the second cylindrical body 28.

The flexible connecting member 22C is a strap having its opposite ends made integral with the first and second flanges 25 and 29, respectively, so as to connect the first and second clip members 22A and 22B together. The length of the connecting member 22C is slightly larger than twice the length between one end of the carpet 5 and the edge of the through hole 7 of the carpet 5.

The clip 2 of the aforementioned construction is attached to the carpet 5 by inserting the first cylindrical body 24 of the first clip member 22A into the through hole 7 of the carpet 5 from below until the first flange 25 abuts the lower surface of the carpet 5, bending the flexible connecting member 22C back around one end of the carpet 5 so as to bring the second cylindrical body 28 opposite the first engaging hole 23 of the first clip member 22A and then pushing the second cylindrical body 28 of the second clip member 22B into the first engaging hole 23 of the first clip member 22A from above until the second flange 29 abuts the upper surface of the carpet 5, thereby causing the engaging protuberances 31 of the second clip member 22B to ride across and engage with the annular engaging projection 26 of the first clip member 22A, with the carpet 5 pinched between the first and second flanges 25 and 29.

On the other hand, the cap member 15 having been fitted over the stud 8 welded upright to the base 3 is inserted into the through hole 6 of the insulator 4 so as to position the insulator 4 on the base 3.

The carpet 5 having the clip 2 attached thereto is positioned on the insulator 4 by pushing the clip 2 toward the cap member 15 so that the tapered end of the cap member 15 is inserted into the second engaging hole 27 of the second clip member 22B until the second annular engaging projection 30 is engaged in the engaging groove 19 of the cap member 15. Thus, the sheet member 1 can be mounted and fixed on the base 3 by the clip 2.

When the carpet 5 is to be detached from the stud 8 for maintenance purposes, for example, the carpet 5 is pulled away from the stud 8 so as to forcibly disengage the second annular engaging projection 30 of the second clip member 22B from the engaging groove 19 of the stud 8. At this time, the clip 2 is still held attached to the carpet 5.

In the embodiment described so far, the sheet member 1 comprises the insulator 4 and the carpet 5. However, the fixing device of the present invention can also be used to fix only one or the other of the insulator 4 and the carpet 5. It goes without saying that the base 3 is not limited to the floor panel of an automobile.

As has been described in the foregoing, according to the present invention, since the plastic cap member is attached to and covers the stud, it is possible to smoothly pass the stud into the through holes of the sheet member without turning up the portions of the sheet member defining the interior peripheries of the through holes. Thus, the operability of the sheet member attachment is enhanced.

Furthermore, since the clip of the present invention has a construction such that it is fitted on the stud through the cap member after it has been attached to the through hole of the sheet member, it can be held attached to the through hole of the sheet member even after it has been detached from the stud. Therefore, it is possible to prevent the clip from being lost.

Moreover, since the clip of the present invention has the first and second clip members integrally connected to each other through the connecting member, it is easy to handle both before attachment to the sheet member and after detachment from the sheet member. Obviously, many modifications and variations of the present invention are possible in light of the above teachings. It is therefore to be understood that within the scope of the appended claims, the present invention may be practiced otherwise than as specifically described herein.

What is claimed is:

1. A fixing device for mounting a sheet member, having a through hole defined therein, upon a base having a stud for passing through said through hole of said sheet member, which comprises:

a plastic cap member for covering said stud and having an engaging portion formed upon a peripheral portion thereof; and a plastic clip engaged with said cap member;

said plastic clip comprising a first clip member which includes a first cylindrical body provided at the center thereof with a first engaging hole, and disposed within said through hole of said sheet member, and a first flange integrally formed upon the periphery of one end of said first cylindrical body for engaging a first surface of said sheet member; a second clip member which includes a second cylindrical body, provided at the center thereof with a second engaging hole for permitting insertion thereinto and engagement therewithin of said cap member, disposed within said first engaging hole of said first clip member, and a second flange integrally formed upon the periphery of one end of said second cylindrical body for engaging a second surface of said sheet member; and a flexible connecting member which has opposite ends integral with said first flange and said second flange, respectively, so as to connect said first clip member and said second clip member together;

said first cylindrical body of said first clip member being inserted, from one side of said sheet member, into said through hole of said sheet member, and said second cylindrical body of said second clip member being inserted, from the other side of said sheet member, into said first engaging hole of said first cylindrical body disposed within said through hole of said sheet member so as to pinch said sheet member between said first and second flanges of said first and second clip members;

said clip, having said sheet member pinched between said first and second flanges of said first and second clip members, being inserted onto and engaged with said cap member covering said stud through means of said second engaging hole of said second clip member;

whereby said sheet member is mounted upon and fixed to said base by said fixing device.

2. The fixing device as set forth in claim 1, wherein:

said flexible connecting member interconnecting said first and second flanges comprises a strap member.

3. The fixing device as set forth in claim 1, wherein:

said engaging portion of said cap member comprises an annular groove; and said second cylindrical body of said second clip member comprises an annular projection for disposition within said annular groove of said cap member, whereby said cap member and said second clip member are secured together.

4. The fixing device as set forth in claim 1, wherein:

said cap member comprises detent means for engaging thread portions of said stud, whereby said cap member is secured upon said stud.

5. The fixing device as set forth in claim 1, wherein:

said first cylindrical body of said first clip member comprises an annular engagement portion; and said second cylindrical body of said second clip member comprises protuberance means for engaging said annular engagement portion of said first cylindrical body of said first clip member so as to fasten said first and second cylindrical bodies of said first and second clip members together.

6. A fastener for fixedly mounting a sheet member, having a through-hole defined therein, upon a support panel having a stud projecting outwardly therefrom and through said through-hole of said sheet member, comprising:

a cap member fixedly mounted upon said stud and having first engagement means provided thereon;

a first clip member having first means for engaging a first surface of said sheet member, and second engagement means for being disposed within said through-hole of said sheet member; and a second clip member having first means for engaging a second surface of said sheet member; second engagement means for being disposed within said second engagement means of said first clip member for engaging said second engagement means of said first clip member so as to fasten said first and second clip members together in such a manner that said sheet member is interposed between said first engaging means of both of said first and second clip members; and third engagement means for engaging said first engagement means of said cap member when said first engagement means of said cap member is disposed within said third engagement means of said second clip member whereby an assembly, comprising said sheet member and said first and second clip members, can be fastened to said cap member so as to, in turn, be fixedly secured to said stud and said support panel.

7. A fastener as set forth in claim 6, wherein:

said cap member comprises detent means for engaging thread portions of said stud so as to fixedly mount said cap member upon said stud which projects upwardly from said support panel.

8. A fastener as set forth in claim 7, wherein:

said first clip member comprises a first flanged portion which comprises said first engaging means for engaging said first surface of said sheet member, and a first, upstanding cylindrical body portion disposed within said through-hole of said sheet member and having an internal bore defined therein; and said second clip member comprises a second flanged portion which comprises said first engaging means for engaging said second surface of said sheet member, and a second, dependent cylindrical body portion for disposition within said internal bore of said first cylindrical body portion of said first clip member, said second cylindrical body portion of said second clip member having an internal bore defined therein for accommodating insertion of said cap member therewithin.

9. A fastener as set forth in claim 6, wherein:

said second engagement means of said first clip member comprises an annular ridge portion; and said second engagement means of said second clip member comprises protuberance means for engaging said annular ridge portion of said first clip member, whereby said first and second clip members are fastened together.

10. A fastener as set forth in claim 6, wherein:

said first engagement means of said cap member comprises an annular groove; and said third engagement means of said second clip member comprises an annular ridge portion for engagement within said annular groove of said cap member, whereby said second clip member and said cap member are fastened together.

11. A fastener as set forth in claim 8, further comprising:

means interconnecting said first and second flanged portions of said first and second clip members so as to prevent separation of said first and second clip members from each other.

12. A fastener as set forth in claim 11, wherein:

said means interconnecting said first and second flanged portions of said first and second clip members comprises a strap member interconnecting said first and second flanged portions together.

* * * * *